United States Patent [19]

Grimes et al.

[11] 4,009,464
[45] Feb. 22, 1977

[54] APPARATUS FOR INDICATING ATTITUDE FAILURE

[75] Inventors: Terrence L. Grimes; Thomas W. Neis, both of Phoenix, Ariz.

[73] Assignee: Sperry Rand Corporation, New York, N.Y.

[22] Filed: Jan. 16, 1976

[21] Appl. No.: 649,886

Related U.S. Application Data

[63] Continuation of Ser. No. 541,299, Jan. 15, 1975, abandoned.

[52] U.S. Cl. .................. 340/27 AT; 73/178 R; 244/194; 318/565; 340/248 B
[51] Int. Cl.² .......................... G08B 21/00
[58] Field of Search ............... 73/178; 116/129 R; 244/178, 179, 181, 194; 307/235 R; 318/563, 565, 566; 340/27, 248 B, 249, 253 B, 253 C, 256

[56] References Cited

UNITED STATES PATENTS

| 3,143,693 | 8/1964 | Fearnside et al. | 244/178 X |
| 3,210,749 | 10/1965 | Magor | 340/248 B |
| 3,383,522 | 5/1968 | Appelbeck et al. | 340/248 B X |
| 3,691,987 | 9/1972 | Strock | 116/129 R |

OTHER PUBLICATIONS

Tosker, Frank H., "Battery-Less Power Failure Alarm", *Popular Electronics*, vol. 28, No. 2, 2-1968, pp. 43-44.

Primary Examiner—Stephen G. Kunin
Attorney, Agent, or Firm—Howard P. Terry

[57] ABSTRACT

Apparatus for indicating attitude failure in an attitude indicator system in which energy is stored and isolated from all other apparatus during normal operation and transferred to the attitude indicator when attitude failure is detected, resulting in an indication of attitude failure.

5 Claims, 3 Drawing Figures

APPARATUS FOR INDICATING ATTITUDE FAILURE

This is a continuation of application Ser. No. 541,299, filed January 15, 1975 now abandoned

BACKGROUND OF THE INVENTION

1. Field of the Invention

The invention relates to attitude indicator systems and in particular to novel apparatus for indicating attitude failure within said systems.

2. Description of the Prior Art

Different approaches have been utilized to indicate attitude failure, usually due to a loss of power, in an attitude indicator system. One such method is described in U.S. Pat. No. 2,613,352 entitled "Radio Navigation System." In that system, the pointers normally utilized to indicate the attitude of the aircraft, are equipped with flags labelled OFF which appear when power is lost. The flags are controlled by relays supervising the power supply for the system.

In order to insure recognition of the attitude, an additional indication is ordinarily provided. Typically, this additional indication has consisted in rotating a spherical member of the attitude indicator system, such as that described in U.S. Pat. No. 2,737,640 entitled "Aircraft Navigation Instrument," substantially about its roll axis. The spherical member is weighted in a manner so that, as power is removed from the system, the gravitational pull of the weight rotates the spherical member through an angular displacement of 60 to 90°. However, weighting does not prove to be practical for attitude indicator systems in which the roll servmomotor, which governs the rotation of the spherical member about its roll axis through a gear train, has substantial drag or where there is appreciable friction in the gear train.

A method is needed which, as in the instances of the prior art mentioned, does not require additional panel space, and which is economical, adaptable to a variety of systems, and which has minimal power requirements during quiescent operating conditions.

SUMMARY OF THE INVENTION

Apparatus for positively indicating attitude failure in an attitude indicator system which stores electrical energy and isolates the same from the attitude indicator, the energy sources and all other apparatus during quiescent operation. A sensing device detects attitude failure and causes a transfer of the energy stored within the apparatus to the attitude indicator resulting in an indication of attitude failure.

DESCRIPTION OF THE PREFERRED EMBODIMENT

Figure 1:
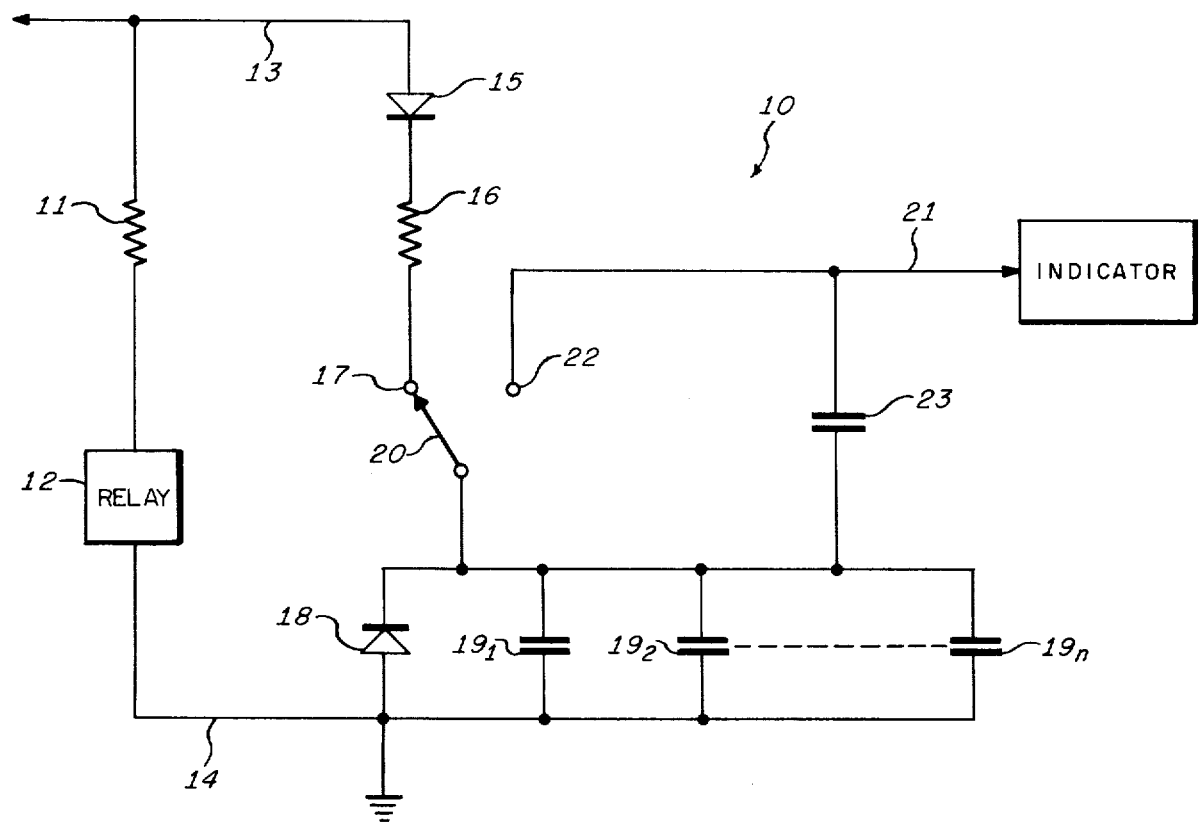
FIG. 1 is a schematic diagram of the circuitry comprising the invention.

FIG. 1 depicts a circuit 10 which embodies the present invention. A resistor 11 and a relay 12 are connected in series between leads 13 and 14. Lead 13 is further connected to a diode 15, a resistor 16, and a normally closed relay contact 17 connected in series. A diode 18 and a plurality of capacitors $19_1, 19_2 \ldots 19_n$ are connected in parallel between lead 14 and a relay armature 20. Lead 21 is connected to a normally open relay contct 22 and one lead of a capacitor 23 while the remaining lead of capacitor 23 is connected to relay armature 20.

Leads 13 and 14 are typically connected to an electrical energy source $V_s$ for the attitude indicator system. Furthermore, lead 13 is coupled to the more positive polarity of the energy source. During quiescent operation of the attitude indicator system, relay coil 12 is maintained in the energized mode by a current which flows from lead 13, through resistor 11, through relay coil 12 and returns to the electrical energy source via lead 14. Resistor 11 is utilized to limit the current consumed by relay coil 12 while relay coil 12 is energized and to limit the transient current produced by relay coil 12 at de-energization. While relay coil 12 is in the energized mode, relay armature 20 is in the transferred state and thereby cooperates with relay contact 17 to form an electrical path. While relay armature 20 remains in the transferred state, a charging current from lead 13 flows through diode 15, resistor 16, relay contact 17 and relay armature 20 which are connected in series to capacitors $19_1, 19_2 \ldots 19_n$, connected in parallel, and returns through lead 14 to the electrical energy source. The amplitude of this current is not constant, but rather, begins at a maximum level when relay coil 12 is first energized and decreases asymtotically with time. Resistor 16 is utilized to limit the current drawn by the capacitors $19_1, 19_2 \ldots 19_n$ especially with respect to the time when relay coil 12 is initially energized. After the capacitors $19_1, 19_2 \ldots 19_n$ have charged to the full potential across leads 13 and 14, the total current requirement for the invention is, for all practical purposes, the minimal amount of current necessary to maintain relay coil 12 in the energized mode.

When the attitude failure occurs, which, for this example, is 2 . . . loss of power to the attitude indicator system, relay coil 12 will de-energize when the potential across leads 13 and 14 decreases to a predetermined level. Typically, this level will be chosen at approximately 1/5 the normal value of the electrical energy source insuring that the potential across the indicator device will have decreased sufficiently before the stored energy is transferred. After relay coil 12 de-energizes, relay armature 20 transfers state and thereby establishes electrical continuity with relay contact 22 while simultaneously opening the electrical path between relay contact 17 and the capacitors $19_1, 19_2 19_n$. In this state, the electrical energy stored within the capacitors $19_1, 19_2 \ldots 19_n$ is transferred through relay armature 20, relay contact 22, and lead 21 to the attitude indicator system until the potential stored within the capacitors $19_1, 19_2 \ldots 19_n$ is substantially dissipated.

When power is restored to the attitude indicator system relay coil 12 will energize again, causing relay armature 20 to transfer state. The transfer of state by relay armature 20 reopens the electrical path between relay contact 22 and relay armature 20 and re-establishes continuity between relay contact 17 and relay armature 20. Thus, the charging current to capacitors $19_1, 19_2 \ldots 19_n$ will be resumed causing electrical energy to be stored therein.

It will be appreciated that during normal operation, the potential stored within capacitors $19_1, 19_2 \ldots 19_n$ is isolated from lead 21 as a result of the discontinuity in the electrical path between relay contact 22 and relay armature 20 caused by the transfer of relay armature 20. Moreover, the potential energy stored within capacitors $19_1, 19_2 \ldots 19_n$ is isolated from the electrical energy source $V_x$ by virtue of diode 15 which obstructs the flow of current out of capacitors $19_1, 19_2 \ldots 19_n$, through relay armature 20, relay contact 17, resistor 16, and into the electrical energy source. Diode 18 is connected in parallel with the capacitors $19_1, 19_2 \ldots 19_n$ and more particularly with its anode coupled to lead 14. Diode 18 is utilized to protect the capacitors $19_1, 19_2 \ldots 19_n$ from an inadvertent polarity reversal of the potential energy source. Capacitor 23, preferably nonpolarized, is provided to protect the apparatus from transients that may be generated as a result of arcing across relay contact 22 and relay armature 20.

Figure 2:
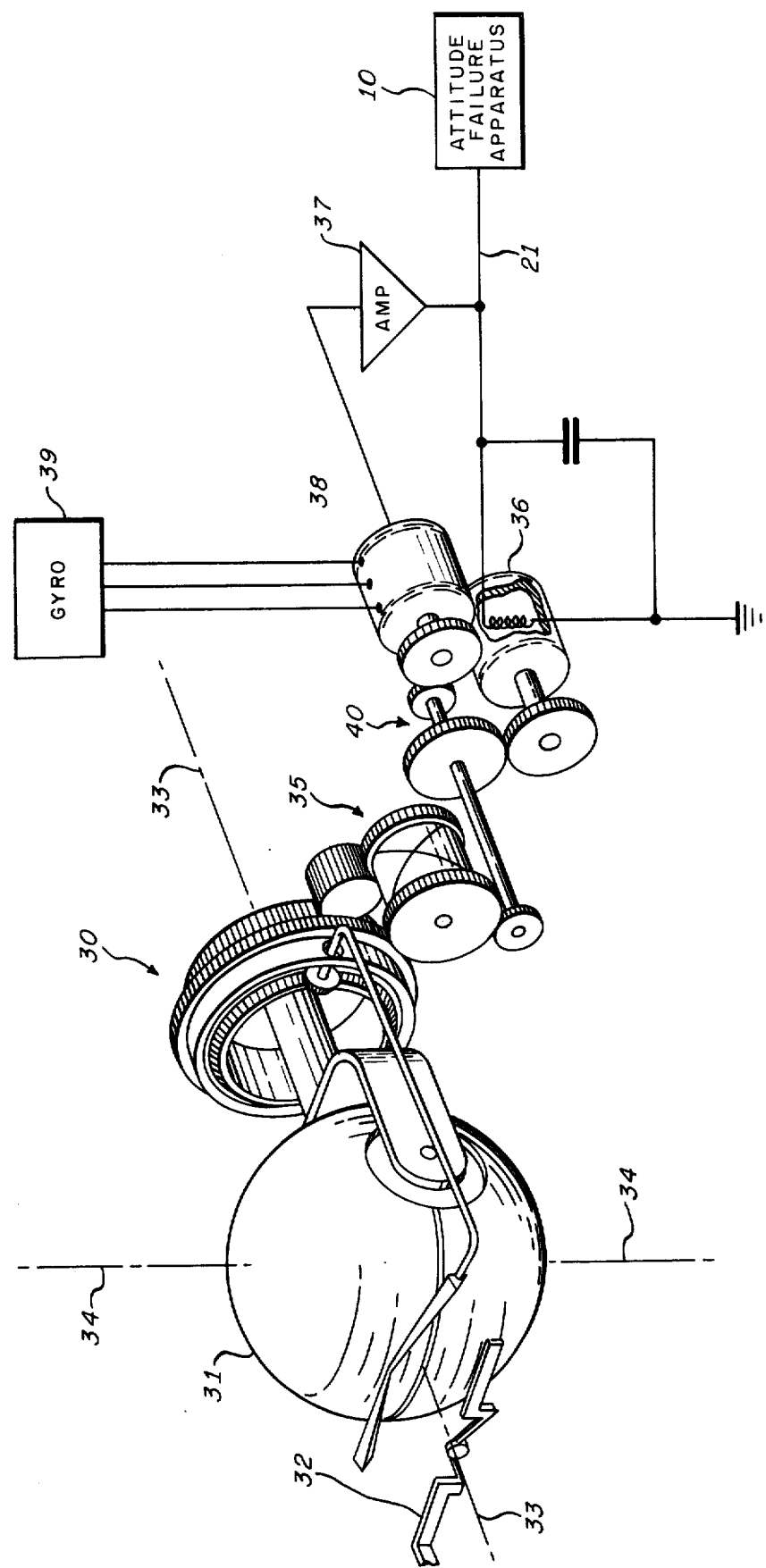
FIG. 2 depicts the mechanism and the control circuitry of an attitude indicator system into which the invention may be incorporated.

FIG. 2 depicts a typical application of the present invention with an attitude indicator 30. Display or spherical member 31 cooperates with a fixed reference index 32 to indicate the attitude of an aircraft in flight. A typical operation of these members is described in U.S. Pat. No. 3,691,987 entitled "Indicator Mechanism for Navigation Instruments" and assigned to the assignee of the present application. Spherical member 31 is rotated about roll axis 33 to indicate rotational movement of the aircraft about its longitudinal axis during flight. The angular displacement of spherical member 31 from vertical axis 34 about the roll axis 33 is governed by gear train 35 in cooperation with roll servomotor 36.

During normal operation the input to roll servomotor 36 is determined by amplifier 37. Amplifier 37 translates the output from control transformer 38 into the proper level for the roll servomotor 36. Control transformer 38 compares the roll attitude input from a navigational device 39, such as a gyroscope or a radio navigation system, with the signal developed by gear train 40 in cooperation with the control transformer 38. The difference between these two signals is coupled to amplifier 37.

As shown in FIG. 2, the output of the invention 10 is coupled to roll servomotor 36 via lead 21. When power is removed from the attitude indicator 30, relay coil 12, as described previously, will de-energize. The energy stored within capacitors $19_1, 19_2 \ldots 19_n$ will be transferred through the relay contacts to lead 21 and dissipated through roll servomotor 36. The potential from capacitors $19_1, 19_2 \ldots 19_n$ is sufficient to drive roll servomotor 36 and produce a torque of a predetermined magnitude. The torque is applied to gear train 35 resulting in a substantial rotation with respect to the fixed reference index for example, 60 to 90 degrees from vertical axis 34 about the roll axis 33, of spherical member 31. Due to the friction in gear train 35 and the drag in roll servomotor 36, spherical member 31 will remain in this position until the power is restored to the attitude indicator 30.

The amount of energy that is required to be stored in capacitors $19_1, 19_2 \ldots 19_n$ will vary with different systems. For the system under consideration in FIG. 2, the amount of energy required to be stored will be determined by the mechanical dynamics of gear train 35, the energy requirements of roll servomotor 36, etc.

It should be noted that capacitors $19_1, 19_2 \ldots 19_n$ may be replaced by a single capacitor of the proper value. However the physical dimensions of such a unitary capacitor may be prohibitive for applications in many systems. In such cases, it is preferable to use a plurality of physically smaller capacitors capable of storing an equivalent amount of energy.

Figure 3:
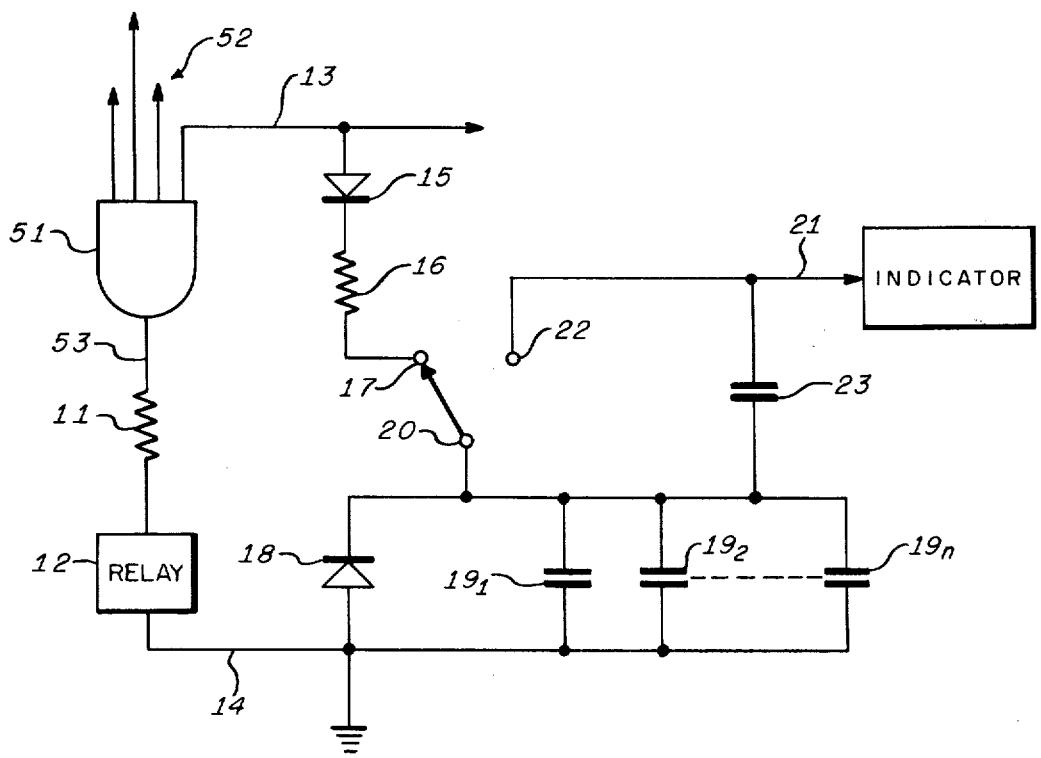
FIG. 3 is a schematic diagram of a modification to the invention of FIG. 1 depicting, in particular, an additional element enabling the invention to supervise a plurality of functions.

FIG. 3 depicts a modification of the invention. The modification consists principally in the addition of an AND gate 51. The addition of AND gate 51 allows the invention to monitor a plurality of electrodes 52 simultaneously. Under normal conditions, all the monitored electrodes 52 will have high potential level thereon causing lead 53 to assume a high potential level. If the potential level on any one of the monitored electrodes is substantially reduced, the potential level on lead 53 will drop to approximately zero. This drop in the potential level on lead 53 will cause the relay coil 12 to de-energize resulting in the operation as described for the configuration of FIG. 1.

It will be appreciated that the invention is a system for indicating attitude failure. The invention overcomes the limitations of the gravity operated device in addition to being reliable and economical. The invention is physically compatible for almost any mounting arrangement. Moreover, the invention requires minimal power during quiescent (normal) operation. The invention may be utilized to supervise the power to the attitude indicator system individually or in addition to supervising a plurality of functions within the attitude indicator system.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In an aircraft indicator system operable from an electrical energy source and having a panel mounted indicator display for indicating to the pilot the attitude of the craft relative to the horizon and a remote vertical gyroscope for providing a horizon reference, electrical control apparatus for positioning said indicator display comprising:

motor means responsive to said vertical gyroscope and coupled through gears to said indicator display for normally positioning said indicator display in accordance with the position of said vertical gyroscope, storage means coupled to said electrical energy source for storing electrical energy, isolation means for isolating said storage means from said motor means during normal operation of said attitude indicator system, sensing means responsive to a failure in said attitude indicator system, and transfer means responsive to said sensing means for transferring the stored energy within said storage means to said motor means after a failure, the magnitude of the stored energy being sufficient to drive said indicator display to a position corresponding to an attitude indicating position greatly exaggerated from a normal aircraft attitude and wherein the motor means and the gears maintain said indicator display in said exaggerated position after dissipation of the stored energy thereby indicating a failure and warning the pilot not to rely on said attitude indicator system.

2. In an attitude indicator system, the apparatus of claim 1 wherein the sensing means includes a relay.

3. In an attitude indicator system, the apparatus of claim 1 wherein the means for storing electrical energy consists of a plurality of capacitors.

4. In an attitude indicator system, the apparatus as described in claim 1 wherein:

said sensing means includes the coil of a relay coupled to the electrical energy source, said isolation means and said transfer means are comprised of a set of relay contacts responsive to said relay coil and coupled between said motor means and said storage means, and said storage means includes a plurality of capacitors normally coupled to said electrical energy source.

5. The apparatus of claim 4 wherein the sensing means further includes a gating device disposed such that said relay coil detects a plurality of malfunctions.

* * * * *